W. J. CROTHERS.
SCISSORS.
APPLICATION FILED JAN. 24, 1916.

1,179,807.

Patented Apr. 18, 1916.

Witnesses
J. H. Crawford
Frank Hough

Inventor
W. J. Crothers,
By Victor J. Evans
Attorney

UNITED STATES PATENT OFFICE.

WILLIAM JOHN CROTHERS, OF TORONTO, ONTARIO, CANADA.

SCISSORS.

1,179,807.  Specification of Letters Patent.  Patented Apr. 18, 1916.

Application filed January 24, 1916. Serial No. 73,935.

*To all whom it may concern:*

Be it known that I, WILLIAM JOHN CROTHERS, a subject of the King of Great Britain, residing at Toronto, in the Province of Ontario and Dominion of Canada, have invented new and useful Improvements in Scissors, of which the following is a specification.

This invention relates to scissors and more particularly to that type of scissors provided with a spring for normally holding the cutting edges of the blades apart.

The primary object of the invention is to provide the scissors with a spring so arranged as to normally hold the cutting edges of the blades apart and having threaded fingers on the arms of the spring passing through transversely extending openings in the shanks of the handle and having adjustably connected therewith fastening elements one of which secures a hook to a threaded finger on one of the arms, while the other fastening element has a reduced portion which serves as a keeper for the hook when the hook is moved to a position to hold the blades of the scissors in closed position.

Another object of the invention is to provide threaded fingers upon the arms of the spring which normally holds the cutting edges of the blades apart so that, fastening elements may be adjustably connected with said fingers and caused to bind against the hook for holding the blades in closed position against the influence of the spring thereby creating sufficient friction between the hook and the shank upon which the hook is disposed to maintain the hook within easy reach of the fore finger of the user of the scissors.

With these and other objects in view the invention resides in the novel combination and arrangement of parts which will be hereinafter described and particularly pointed out in the claims.

The preferred embodiment of the invention has been illustrated in the accompanying drawing, although no restriction is necessarily made to the precise details of construction therein shown, as changes, alterations and modifications within the scope of the claims may be resorted to when so desired.

Figure 1:
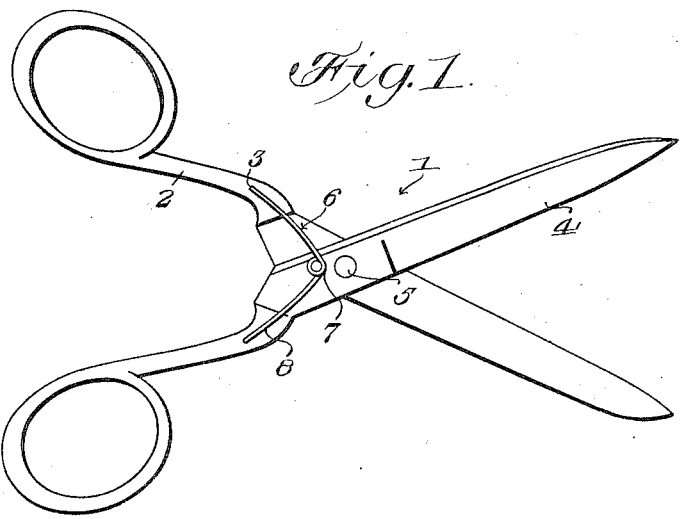
Figure 2:
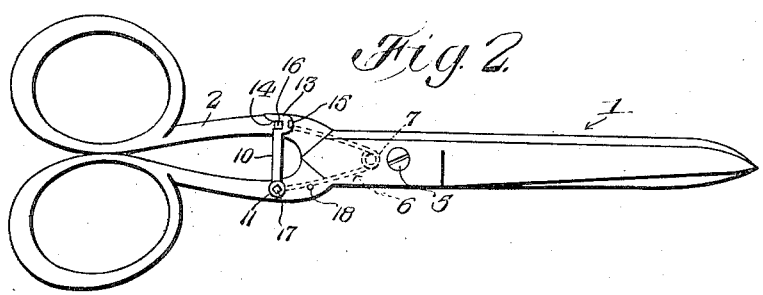
Figure 3:
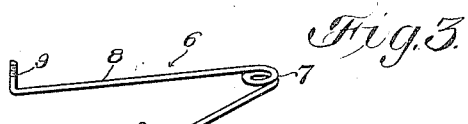
Figure 4:
Figure 5:
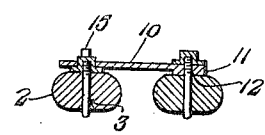

In the drawings:—Figure 1 is a plan view of a pair of scissors showing the invention applied thereto, the cutting edges of the blades being held apart by a spring connected with the shanks of the scissors. Fig. 2 is a view of the reversed side of the scissors showing the blades held in closed position against the influence of the spring by means of a hook connected with a threaded finger on the spring. Fig. 3 is a perspective view of the spring removed from the scissors. Fig. 4 is a detail perspective view of one of the nuts for threaded engagement with one of the fingers on the spring and serving as a keeper for the hook. Fig. 5 is a transverse section through the shanks of the scissors to more clearly disclose the position of the threaded fingers upon the spring and parts associated therewith.

Like characters of reference denote corresponding parts throughout the several views in the drawing.

Referring now to the drawing in detail, the numeral 1 designates a pair of scissors the shanks 2 of which are provided with transversely extending openings 3 between their ends, the blades 4 of the scissors being pivotally connected by the usual pin 5.

A spring 6 is provided for normally holding the cutting edges of the blades apart and comprises a strip of material bent and coiled between its ends, as indicated at 7, to provide diverging arms 8 adapted to lie in a plane parallel with the shanks 2 and having their free ends bent at a right angle to arms 8 to provide threaded fingers 9 loosely passing through the openings 3 in the shanks and extending beyond the same.

From the above described arrangement it will at once be apparent that the fingers on the ends of the arms are spaced a sufficient distance from the pivotal connection of the blades to exert an influence due to the inherent resiliency of the arms tending to cause the cutting edges of the blades to be normally held apart and that upon moving the handle of the scissors toward each other the cutting edges of the blades may be moved into cutting position thus obviating the necessity of the user of the scissors being compelled to open the blades after each cutting operation.

A hook 10 is positioned upon one of the shanks 2 and upon the opposite sides thereof from that which is in contact with an arm 8 of the spring 6, said hook having a terminal 11 provided with an aperture 12 loosely receiving the extending end of the spring finger passing through the opening 3 in said shank. The remaining end of the hook has a bill 13 providing an attenuated recess 14 in the end of the hook. The end of the bill 13 which projects beyond the recess 14 has an upwardly curved bottom edge for a purpose which will be presently described, while said bill also has at one side thereof a laterally projecting lip 15.

Threaded nuts 16 and 17 are adjustably engaged with the threaded fingers on the spring arms 8 thus securing the spring to the shanks and enabling one of the threaded fingers to provide a pivot about which the hook may be turned.

The nut 16 has a reduced portion corresponding in shape to the recess 14 in the bill of the hook and serves as a keeper for the hook when the bill of the hook is engaged therewith, while the nuts 17 serve to frictionally engage the other end of the hook with one of the shanks so that when the hook is moved by the fore finger of the user of the scissors the hook may be retained within convenient reach at all times.

A pin 18 is threadably engaged with one of the shanks 2 and is positioned in the path of movement of the hook 10 to prevent the hook being turned too far about its pivotal connection with the shank when pressure is applied to the lip 15 by means of the fore finger of the user of the scissors.

When the scissors are in use and it is desired to hold the blades in closed position the tip of the fore finger of the user of the scissors is engaged with the lip 15 on the bill of the hook and the finger bent to cause the hook to be turned about its pivotal connection with the shank until the recess 14 receives the reduced end on the nut 16 in which position the spring arm will prevent the casual displacement of the bill of the hook from the nut thus retaining the blades in closed position.

When it is desired to release the hook from engagement with the nut 16 so that the cutting edges of the blades may be normally held apart by the spring arms 8 pressure of the fore finger of the user of the scissors is exerted against the lip 15 until the curved edge on the bill contacts with the reduced portions on the nut 16 whereupon the spring arms will have sufficient force to cause the nut to ride over said curved face and throw the hook to a position beyond the nut 16.

It will also be noted with reference to the drawing that the pin 18 will support the hook in a plane parallel with the shank on the scissors with which the pin is connected and with the bill of the hook positioned above the material which it is desired to cut with the scissors thereby preventing the hook from becoming entangled with the material.

From the above statement taken in connection with the accompanying drawing it is at once apparent, that a scissor attachment has been provided, which will normally hold the cutting edges of the blades apart, and said attachment also including a hook whereby the blades of the scissors may be held in closed position when so desired.

Having thus described the invention what is claimed as new is:—

1. In combination with a pair of scissors having transversely extending openings in the shanks thereon, a spring having arms provided with fingers received in said openings to hold the cutting edges of the blades apart, fastening elements on the fingers for holding the spring in contact with the shanks, and a hook adapted to act in opposition to the spring carried by one of the fingers and held in contact with one of the shanks by one of the securing elements.

2. The combination with a pair of scissors having transversely extending openings in the shanks thereon, a spring having fingers passing through said openings to normally hold the cutting edges of the blades apart, a hook carried by one of the fingers, and a nut upon the other finger providing a keeper for engagement with the hook.

3. The combination with a pair of scissors having transversely extending openings between the ends of the shanks, a spring coiled between its ends to provide diverging arms having threaded fingers loosely passing through said openings and beyond the same to normally hold the cutting edges of the blades apart, a securing nut threadably engaged with the threaded finger on one of the arms and provided with a reduced portion, a hook mounted to turn on the finger on the other arm and engage with the reduced portion on the nut to act in opposition to the spring, and a clamping nut adjustably engaged with the last mentioned finger to frictionally clamp the hook against the side of the shank.

In testimony whereof I affix my signature.

WILLIAM JOHN CROTHERS.